(12) United States Patent
Helm

(10) Patent No.: US 9,597,984 B2
(45) Date of Patent: *Mar. 21, 2017

(54) SYSTEMS AND METHODS FOR CHILD RESTRAINT MONITORING

(71) Applicant: Toyota Motor Engineering & Manufacturing North America, Inc., Erlanger, KY (US)

(72) Inventor: Sean L. Helm, Saline, MI (US)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 113 days.

This patent is subject to a terminal disclaimer.

(21) Appl. No.: 14/930,892

(22) Filed: Nov. 3, 2015

(65) Prior Publication Data

US 2016/0052427 A1  Feb. 25, 2016

Related U.S. Application Data

(63) Continuation of application No. 14/076,784, filed on Nov. 11, 2013, now Pat. No. 9,187,013.

(51) Int. Cl.
*B60Q 1/00* (2006.01)
*B60N 2/28* (2006.01)
*B60N 2/26* (2006.01)
*B60N 2/00* (2006.01)
*G08B 21/02* (2006.01)

(52) U.S. Cl.
CPC .......... *B60N 2/2803* (2013.01); *B60N 2/002* (2013.01); *B60N 2/265* (2013.01); *B60N 2/2806* (2013.01); *B60N 2/2812* (2013.01); *G08B 21/02* (2013.01); *B60N 2002/2815* (2013.01)

(58) Field of Classification Search
CPC .... B60N 2002/2815; B60N 2002/2818; B60N 2/26; B60R 2022/4841; G08B 21/0202
USPC .............. 340/457, 438, 457.1, 667; 701/45; 180/268
See application file for complete search history.

(56) References Cited

U.S. PATENT DOCUMENTS

| | | | |
|---|---|---|---|
| 7,478,875 B2 | 1/2009 | Patterson et al. | |
| 8,179,274 B2 * | 5/2012 | Rork | B60N 2/002 297/216.11 |
| 8,190,332 B2 | 5/2012 | Saban | |
| 2005/0092539 A1 | 5/2005 | Chitalia et al. | |
| 2005/0275554 A1 | 12/2005 | Patterson et al. | |
| 2006/0049929 A1 | 3/2006 | Lawrence et al. | |
| 2007/0096891 A1 | 5/2007 | Sheriff et al. | |

(Continued)

*Primary Examiner* — Phung Nguyen
(74) *Attorney, Agent, or Firm* — Dinsmore & Shohl LLP

(57) ABSTRACT

Included are systems and methods for child restraint monitoring. Some embodiments include determining that a child restraint seat has been installed in a vehicle seat of a vehicle, determining whether the child restraint seat is being properly utilized, and detecting an issue with the utilization of the child restraint seat. Some embodiments include determining that a guardian is remote from the vehicle and, in response to detecting the issue with the utilization of the child restraint seat and determining that the guardian is remote from the vehicle, sending a communication to a third party, wherein the communication provides an option to contact the vehicle to regarding improper utilization of the child restraint seat.

20 Claims, 7 Drawing Sheets

(56) References Cited

U.S. PATENT DOCUMENTS

| | | | |
|---|---|---|---|
| 2008/0195283 A1* | 8/2008 | Hunkeler | B60R 21/0155 |
| | | | 701/45 |
| 2009/0040036 A1 | 2/2009 | Talis | |
| 2009/0234542 A1* | 9/2009 | Orlewski | B60N 2/002 |
| | | | 701/45 |
| 2013/0021476 A1* | 1/2013 | Trummer | B60R 22/48 |
| | | | 348/148 |
| 2013/0201013 A1* | 8/2013 | Schoenberg | B60R 22/48 |
| | | | 340/438 |

* cited by examiner

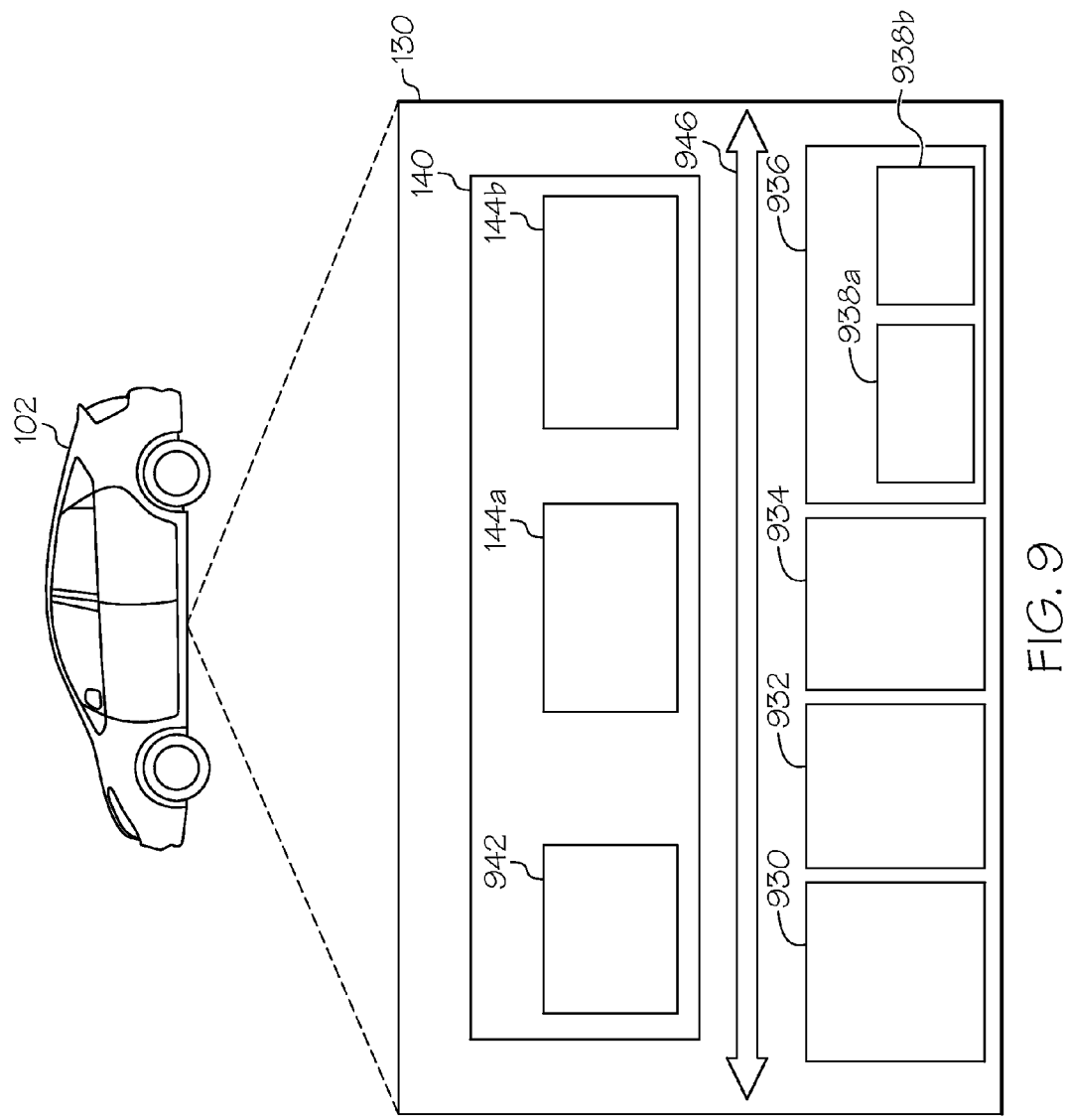

SYSTEMS AND METHODS FOR CHILD RESTRAINT MONITORING

CROSS REFERENCE

This application is a continuation of U.S. application Ser. No. 14/076,784, filed Nov. 11, 2013, which is hereby incorporated by reference in its entirety.

TECHNICAL FIELD

Embodiments described herein generally relate to child restraint monitoring and, more specifically, to systems and methods that provide information related to the proper utilization of a child restraint seat.

BACKGROUND

There are currently vehicle seatbelt systems that alert a driver regarding whether a non-driving passenger has fastened his/her seatbelt. As an example, many vehicles now include an occupant sensor in the seat, as well as a seatbelt connection sensor. The occupant sensor may be a weight sensor that detects whether a passenger is sitting in the seat. If an occupant is sitting in the seat, the seatbelt connection sensor determines whether the passenger has latched the seatbelt. If the seatbelt is latched, no alert may be provided. If the passenger is sitting in the seat and the seatbelt is not latched, an alert may be provided to the passenger or others in the vehicle to instruct the passenger to fasten the seatbelt.

While such systems have proven useful for adult passengers, oftentimes such as system may not operate properly when a child passenger is in the vehicle and using a child restraint seat. As an example, many occupant sensors are configured to only detect a passenger that is greater than a predetermined weight (e.g., 80 pounds). If a child is put into a child restraint seat, this threshold may not be met, so there is no alert provided. Additionally, these current solutions have no ability to determine whether the child restraint seat is properly utilized.

SUMMARY

Included are systems and methods for child restraint monitoring. Some embodiments include determining that a child restraint seat has been installed in a vehicle seat of a vehicle, determining whether the child restraint seat is being properly utilized, and detecting an issue with the utilization of the child restraint seat. Some embodiments include determining that a guardian is remote from the vehicle and, in response to detecting the issue with the utilization of the child restraint seat and determining that the guardian is remote from the vehicle, sending a communication to a third party, wherein the communication provides an option to contact the vehicle to regarding improper utilization of the child restraint seat.

In another embodiment, a system for child restraint monitoring includes a processor and a memory component. The memory component may store logic that, when executed by the processor, causes the system to determine that a child restraint seat has been installed in a vehicle seat of a vehicle, where the child restraint seat comprises a first sensor for detecting whether the child restraint seat is being properly utilized in the vehicle seat and receive a first signal from the first sensor, the first signal indicating whether the child restraint seat is being utilized properly. In some embodiments, the logic causes the system to determine, from the first signal, an issue with utilization of the child restraint seat and, in response to determining the issue with utilization of the child restraint seat, provide an option to address the issue. In some embodiments, the logic causes the system to, in response to receiving a user selection of the option, send a command to automatically address the issue with utilization of the child restraint seat.

In yet another embodiment, a system includes a vehicle seat for a passenger of a vehicle, the vehicle seat receiving a child restraint seat for a child, where the vehicle seat includes a sensor that detects a characteristic of utilization of the child restraint seat, and where the vehicle seat includes a first motor for adjusting a configuration of the vehicle seat. The system may also include a computing device that includes a processor and a memory component, where the memory component stores logic that, when executed by the processor, causes the system to determine that the child restraint seat has been installed in the vehicle seat and receive a signal from the sensor, where the signal indicates whether the child restraint seat is being utilized properly. In some embodiments, the logic causes the system to determine, from the signal, an issue with utilization of the child restraint seat and in response to determining the issue with utilization of the child restraint seat, provide an option to address the issue. In some embodiments, in response to receiving a user selection of the option, the logic may cause the system to send an activation command to the first motor to automatically address the issue with utilization of the child restraint seat.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 9 depicts a vehicle computing device for monitoring a child restraint seat, according to embodiments disclosed herein.

DETAILED DESCRIPTION

Embodiments disclosed herein include systems and methods for child restraint monitoring. Some embodiments include hardware and/or software for determining whether a child restraint seat is positioned in a vehicle; whether a child is positioned and restrained in the child restraint seat; and whether the child restraint seat is properly secured to the vehicle seat. Specifically, many child restraint seats secure to a vehicle seat via the vehicle's seatbelt system. Embodiments disclosed herein may be configured to determine whether the vehicle seatbelt is secured to the child restraint seat and whether the vehicle seatbelt is secured with proper tension to secure the child restraint seat. Some embodiments may be configured to determine whether the restraint system on the child restraint seat is secured and at a predetermined tension (e.g., that the belt is fastened and properly tightened to the child). Some embodiments may be configured to determine the pitch, roll, and/or yaw of the child restraint seat to ensure that the child restraint seat is properly aligned in the seat. Some embodiments may also indicate whether power from the child restraint seat is low, determine which child restraint seat in the vehicle has issues (when more than one is in use), and/or provide other information.

If an error is determined in the use of the child restraint seat (and/or if the child restraint seat is being used properly), embodiments disclosed herein may provide an in-vehicle signal of the positive or negative action. In some embodiments, this signal is transmitted through the vehicle multimedia system and/or is sent to the child restraint seat, which can provide the signal. Some embodiments may be configured to provide a signal to a mobile device, such as a mobile telephone. Such an embodiment may provide a guardian of the child or other person with notice that the child restraint seat is not being used properly and may allow the mobile phone to contact the vehicle to allow the guardian to interact with the driver for properly utilizing the child restraint seat. Similarly, a signal may be provided to an administrator (such as the manufacturer of the child restraint seat) to contact the driver for instructing the driver on properly utilizing the child restraint seat.

Figure 1:
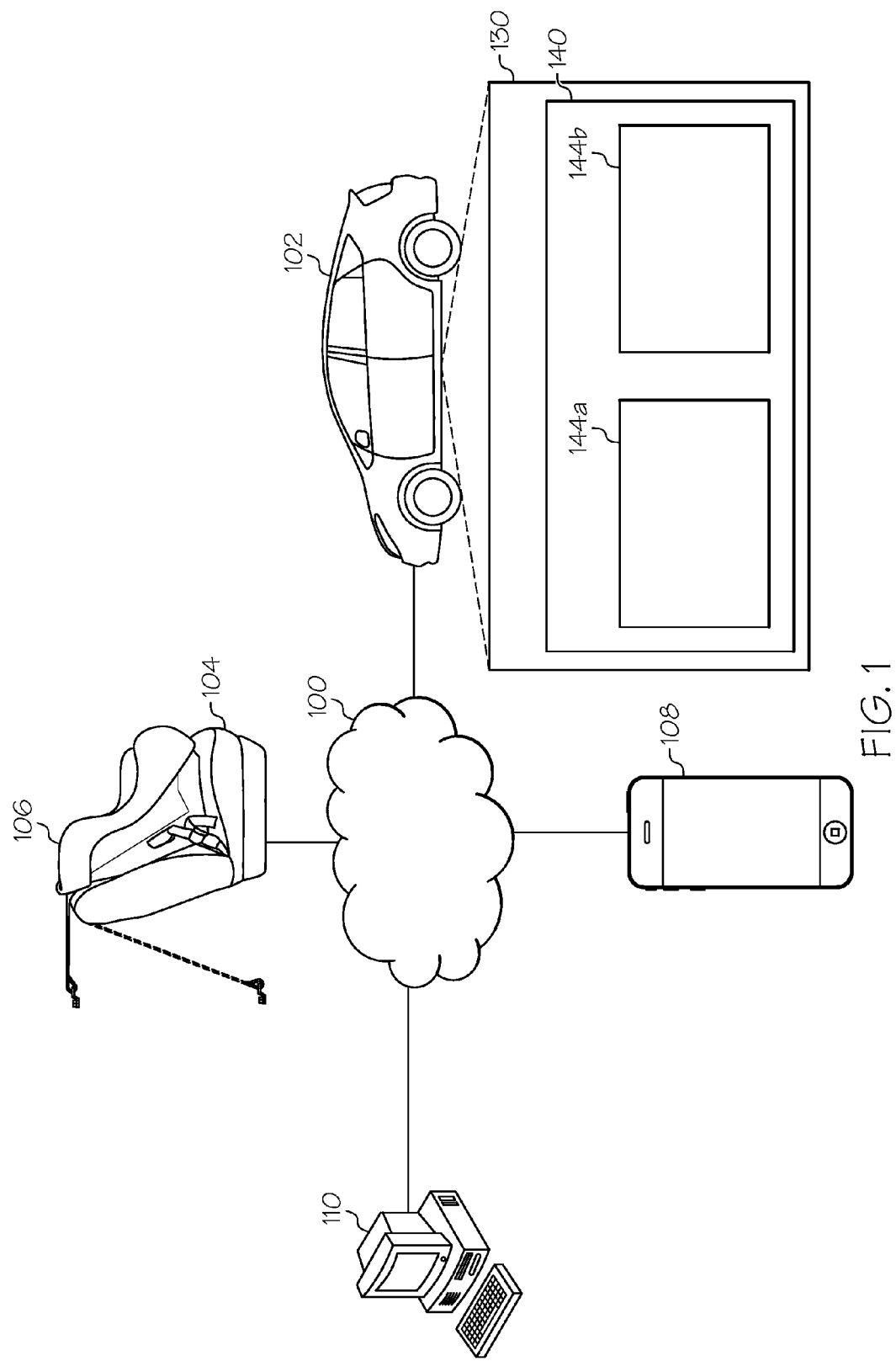
FIG. 1 schematically depicts an environment for monitoring a child restraint seat, according to embodiments disclosed herein.

Referring now to the drawings, FIG. 1 schematically depicts an environment for monitoring a child restraint seat, according to embodiments disclosed herein. As illustrated, a network 100 may be coupled to a vehicle 102, which includes a vehicle seat 104 and a child restraint seat 106, a mobile computing device 108, and an administrator computing device 110. The network 100 may include a wide area network, such as the internet, a cellular network (such as 3G, 4G, 4G LTE, WiMax, etc.). Similarly, the network 100 may include a local area network, such as a wireless fidelity (WiFi) network, a Bluetooth network, a near field communication network, hardwire, etc.

The vehicle 102 may be coupled to the network 100 and may include a vehicle computing device 130. The vehicle 102 may additionally be coupled to the vehicle seat 104 and/or the child restraint seat 106. The vehicle seat 104 may be integral with the vehicle 102, but may be configured to communicate with the vehicle computing device 130 via the network 100. The child restraint seat 106 may be removably coupled to (and/or integral with) the vehicle seat 104 and may be configured to communicate with the vehicle seat 104 and/or the vehicle computing device 130 via the network 100.

Similarly, the mobile computing device 108 may be configured as a mobile phone, a tablet, a personal computer, and/or other device for performing the functionality described herein. The mobile computing device 108 may be operated by a guardian of the child in the child restraint seat 106 and/or other third party. Similarly, the administrator computing device 110 may be configured as a personal computer, tablet, mobile telephone, etc. and may be operated by an administrator that is situated for assisting in the proper utilization of the child restraint seat 106.

Also depicted in FIG. 1 is the vehicle computing device 130 that includes a memory component 140. The memory component 140 may store logic, such as detection logic 144a and communication logic 144b. The detection logic 144a may be executed by a processor (such as processor 930 from FIG. 9) of the vehicle computing device 130 to cause the vehicle computing device 130 to detect one or more signals (such as a first signal and a second signal) from sensors in the vehicle 102 (including sensors in the vehicle seat 104 and/or the child restraint seat 106). The communication logic 144b may cause the vehicle computing device 130 to communicate the detected signals to a vehicle passenger, to a remote guardian, to an administrator, and/or to others. Other components of the vehicle computing device 130 may be provided in FIG. 9, described in more detail, below.

Figure 2:
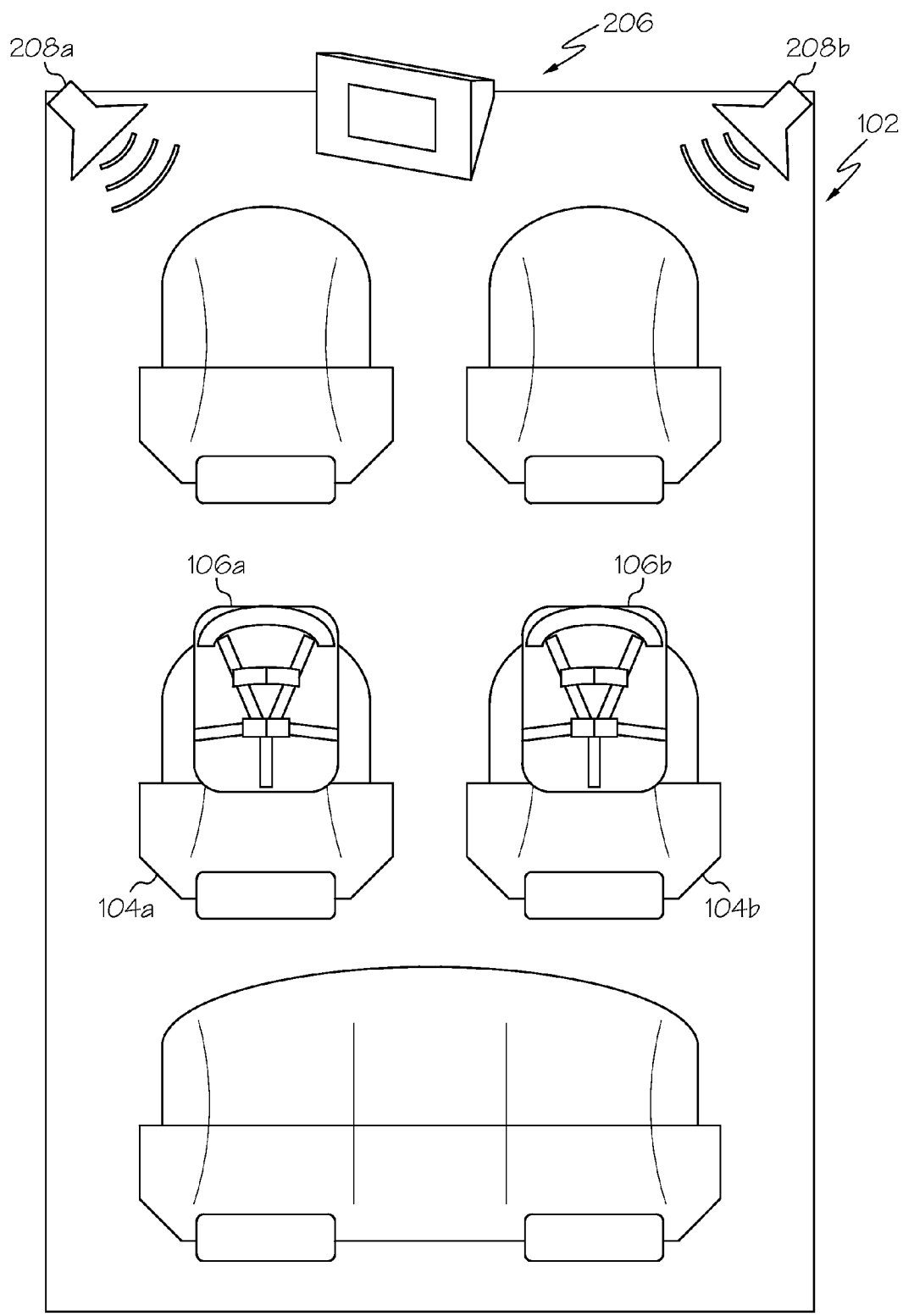
FIG. 2 schematically depicts a vehicle interior, which includes a plurality of child restraint seats, according to embodiments disclosed herein.

FIG. 2 schematically depicts an interior of the vehicle 102, which includes a plurality of child restraint seats 106a, 106b, according to embodiments disclosed herein. As illustrated, the vehicle 102 may include an on-board display device 206, which may be coupled to one or more speakers 208a, 208b and/or microphones. While not explicitly depicted in FIG. 2, some embodiments may be configured with speakers and/or microphones in the vehicle seats 104a, 104b, and/or in other areas of the vehicle 102. As discussed in more detail below, embodiments may be configured to utilize one or more sensors to detect whether the child restraint seats 106a, 106b are properly installed in the vehicle seats 104a, 104b. If the child restraint seats 106 are installed properly, an indication of proper utilization (or no indication) may be provided via the on-board display device 206, the mobile computing device 108 (FIG. 1), and/or the administrator computing device 110 (FIG. 1).

Accordingly, some embodiments may be configured such that the child restraint seat 106 is includes one or more sensors (such as a first sensor and a second sensor) for determining whether the child restraint seat 106 is properly utilized. The child restraint seat 106 may communicate this sensor data to the vehicle computing device 130, which may determine, from the signal data, the current issue with the child restraint seat 106 and adjustments that should be made. In some embodiments, the child restraint seat 106 may include a computing device and/or logic for making this determination and then communicating the information to the passengers and/or third parties. In some embodiments, the child restraint seat 106 is instead paired with a mobile computing device 108 of a passenger (driver or non-driving passenger), which then communicates the data to the vehicle computing device 130.

Additionally, some embodiments may be configured to facilitate correcting the current issue with the utilization of the child restraint seat 106. As discussed in more detail below, the vehicle seat 104 and/or the child restraint seat 106 may include one or more motors (such as a first motor and a second motor) for adjusting the seatbelt, the child restraint seat 106, and/or the vehicle seat 104. Thus, when an error in the utilization of the child restraint seat 106 is detected, mechanisms such as an activation command (first activation command and/or second activation command) from the vehicle computing device 130 to the motor or other device may be implemented for correcting the error.

It should also be understood that FIG. 2 illustrates that some embodiments are configured to accommodate a plurality of different child restraint seats 106, as well as detect proper utilization of each and provide instructions and/or repair an issue with the child restraint seats 106. Accordingly, the functionality described herein may be configured to individually identify issues with each child restraint seat 106a, 106b and/or address issues with the utilization of each child restraint seat 106a, 106b.

Figure 3B:
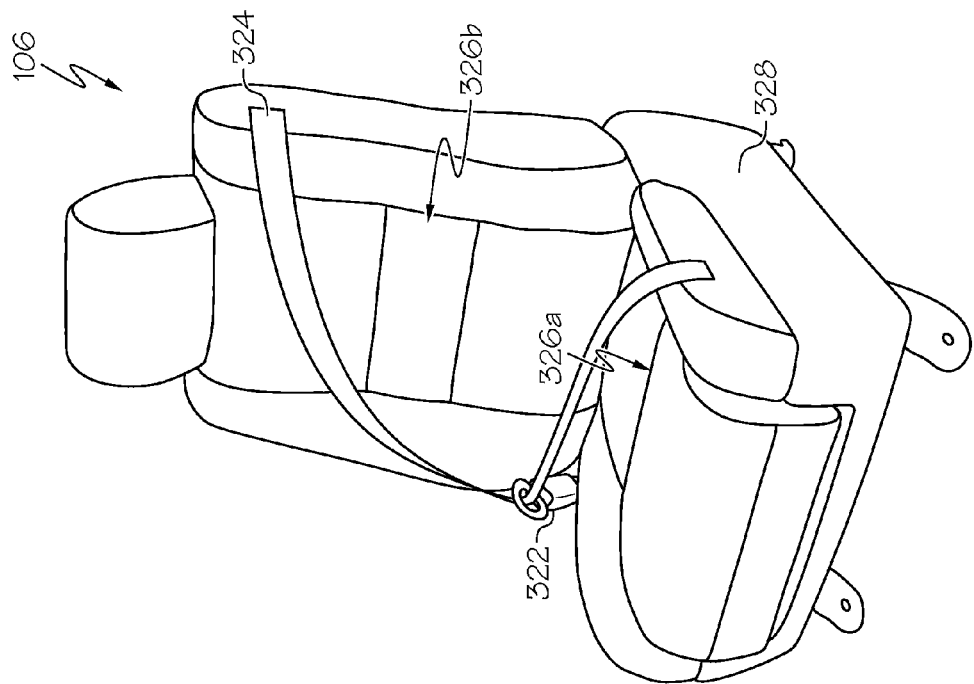
FIG. 3B schematically depicts a vehicle seat, according to embodiments disclosed herein.
Figure 3A:
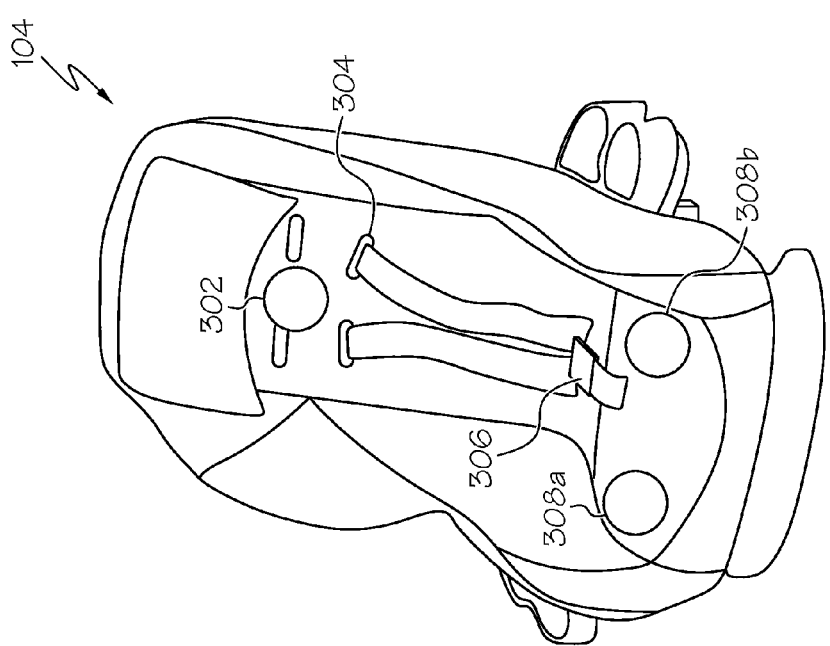
FIG. 3A schematically depicts a child restraint seat, according to embodiments disclosed herein.

FIG. 3A schematically depicts a child restraint seat 106, according to embodiments disclosed herein. As illustrated, the child restraint seat 106 may be configured to receive a seatbelt of the vehicle 102 and utilize that seat belt to secure the child restraint seat 106 to the vehicle seat 104. Additionally, the child restraint seat 106 includes a plurality of sensors for detecting whether the child restraint seat 106 is being properly utilized. As an example, the child restraint seat 106 may include a seatbelt tension sensor 302 for determining whether the vehicle seatbelt has adequate tension, a child restraint seat seatbelt tension sensor 304 may be configured for determining whether the child restraint seat seatbelt has a proper amount of tension to adequately restrain the child; a child restraint seat seatbelt latch sensor 306 for determining whether the child restraint seat seatbelt is buckled; and a tilt sensor 308a, 308b for determining a tilt angle of the child restraint seat 106. Depending on the embodiment, one or more of these sensors (or other sensors) may be included with the child restraint seat 106. Additional sensors could include a vehicle seatbelt engagement sensor that determines whether the vehicle seatbelt has been properly attached to the child restraint seat 106. Similarly, another sensor may detect motion of the child restraint seat 106 with respect to the vehicle 102 to determine the movement of the child restraint seat 106 when the vehicle 102 is in operation. In still some embodiments, sensors may be included to ensure that the child is properly placed in the child restraint seat 106.

Other sensors may also be included, such as a power level sensor of the child restraint seat 106. In some embodiments, the child restraint seat 106 may include electronic and/or other components that require electrical power. While some of these embodiments may access power provided by the vehicle 102, some embodiments may utilize portable power, such as a battery. As a consequence, a sensor may determine when the power level has dropped below a predetermined threshold and alert a passenger that a recharge will be needed soon.

As indicated above, the child restraint seat 106 may additionally include one or more motors or other devices to correct detected issues with the installation or utilization of the child restraint seat 106. As an example, if the seatbelt tension sensor 302 detects that the tension of the seatbelt is lower than desired, the child restraint seat 106 may activate a motor to correct this issue. Similarly, if the tilt sensor 308 detects that the child restraint seat 106 is not level, the child restraint seat 106 may activate a device to level the seat.

The child restraint seat 106 may also include communications logic (hardware and/or software) for communicating the sensor output to the vehicle computing device 130. As an example, if one or more of the sensors 302-308 detect that the child restraint seat 106 is improperly utilized, the sensors 302-308 may send sensor output to the communications logic. The communications logic may then cause a processor to send the information to the vehicle computing device 130.

It should be understood that in some embodiments, the child restraint seat 106 simply includes the described sensors, motors, devices, and communication logic. In such embodiments, the sensor data is communicated to the vehicle computing device 130. The vehicle computing device 130 determines issues with the child restraint seat 106 from the sensor data and may additionally determine a solution for correcting the issue and/or alerting a passenger or third party. The vehicle computing device 130 may also send a signal back to the child restraint seat 106, which then may activate a motor and/or other device for correcting the issue. The vehicle computing device 130 may also communicate the issue, solution, and/or options to a vehicle passenger via the on-board display device 206, and/or to a third party via the mobile computing device 108 and/or the administrator computing device 110.

Similarly, some embodiments may be configured such that at least a portion of the logic resides in the child restraint seat 106. As an example, the child restraint seat 106 may determine the nature of the issue and determine the solution for correcting the issue. In such embodiments the child restraint seat 106 may communicate the determined issue, solution, and/or other options to a passenger and/or third party via the vehicle computing device 130, the mobile computing device 108 and/or the administrator computing device 110.

FIG. 3B schematically depicts a vehicle seat 104, according to embodiments disclosed herein. As illustrated, the vehicle seat 104 includes a seatbelt latch sensor 322, a seatbelt strap sensor 324, a seat sensor 326a, a lumbar sensor 326b, and a vehicle seat position control 328. Specifically, the seat sensor 326a and the lumbar sensor 326b may be utilized to determine if a passenger is seated in the vehicle seat 104. As an example, the seat sensor 326a and the lumbar sensor 326b may be configured to detect a characteristic of utilization of the child restraint seat 106, such as whether a weight is placed in the vehicle seat 104. Additionally, based on the amount of weight placed on the vehicle seat 104 and/or the distribution of that weight, the seat sensor 326a and the lumbar sensor 326b may determine whether the passenger in the vehicle seat 104 is an adult or a child in a child restraint seat 106.

Additionally, some embodiments may be configured to determine the weight distribution to ensure that the child restraint seat 106 is properly positioned in the vehicle seat 104 (e.g., facing the proper direction, centered, etc.). Regardless, if it is determined that a child in the child restraint seat 106 is present in the vehicle seat 104, the seatbelt latch sensor 322 and the seatbelt strap sensor 324 may activate to further determine whether the child restraint seat 106 is being properly utilized.

In some embodiments, the vehicle seat 104 may communicate the sensor data to the vehicle computing device 130 to determine whether there is an issue with the utilization of the child restraint seat 106 is proper. The vehicle computing device 130 may additionally provide commands to the vehicle seat 104 for making adjustments, thereby correcting the issue with the child restraint seat 106. As an example, if the vehicle computing device 130 determines that the seatbelt tension of the vehicle seat 104 is too low, the vehicle computing device 130 may alert a passenger and/or third party. Additionally, the vehicle computing device 130 may send a command to the vehicle seat 104 to adjust a configuration of the vehicle seat 104 and/or the child restraint seat 106, such as tighten the seatbelt tension. Similarly, if the vehicle seat 104 is improperly positioned (e.g., the lumbar is too reclined, the vehicle seat 104 is too far back in the vehicle 102, etc.), the vehicle computing device 130 may determine the issue, contact a passenger/third party and/or send a command to correct the issue.

It should be understood that, while the vehicle seat 104 may communicate sensor data to the vehicle computing device 130, some embodiments may be configured for the vehicle seat 104 to communicate the sensor data to the child restraint seat 106 for determining an issue. In such an embodiment, the child restraint seat 106 may directly communicate with the vehicle seat 104 and/or communicate with the vehicle computing device 130 to correct the issue with the vehicle seat 104.

Figure 4:
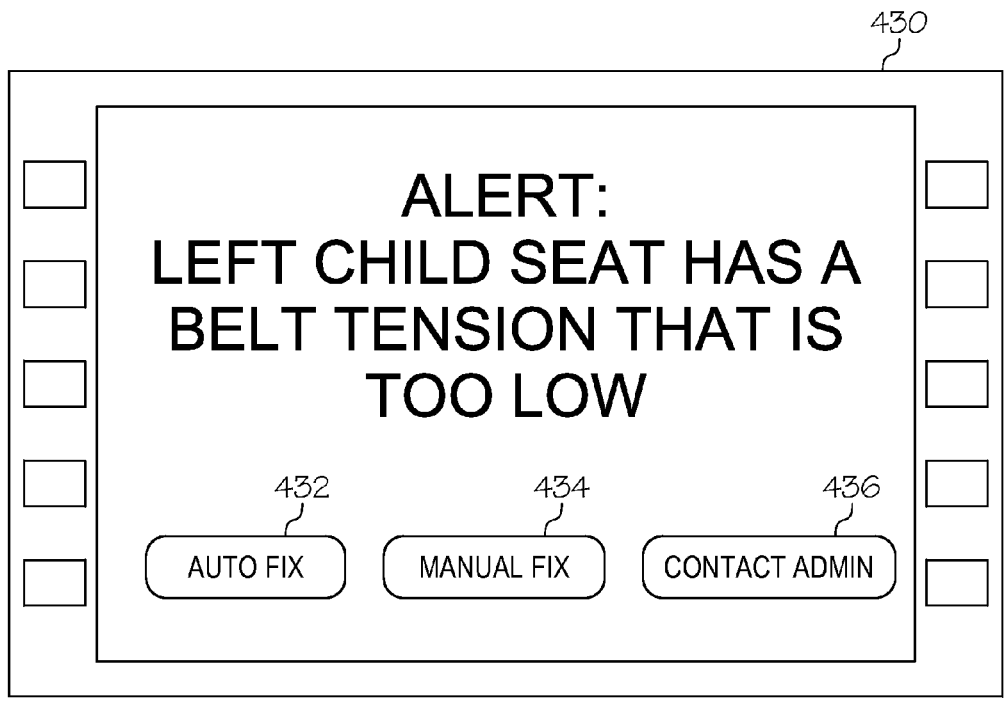
FIG. 4 schematically depicts a user interface that may be provided for alerting a vehicle passenger of improper utilization of a child restraint seat, according to embodiments disclosed herein.

FIG. 4 schematically depicts a user interface 430 that may be provided for alerting a vehicle passenger of improper utilization of a child restraint seat 106, according to embodiments disclosed herein. As discussed above, in response to a determination that there is an issue with the child restraint seat 106, the vehicle computing device 130 may provide an alert to a passenger (driver and/or non-driving passenger) of the vehicle 102. As indicated in the user interface 430, the vehicle computing device 130 has determined that the seatbelt tension of the child restraint seat 106 is too low. Accordingly, the user interface 430 provides a plurality of options for addressing this issue. Specifically, the user interface 430 includes a repair option (one or more), such as an automatic repair option 432, a manual repair option 434, and a contact administrator option 436. In response to selection f the automatic repair option 432, the vehicle computing device 130 may send a command to a motor (and/or other device) of the child restraint seat 106 for tightening the tension of the seatbelt of the child restraint seat 106. In response to selection of the manual repair option 434, the vehicle computing device 130 may provide the passenger with instructions for correcting the issue. The passenger may then manually take steps to correct the issue. In response to selecting the contact administrator option 436, an administrator or other third party may be contacted for reporting and/or addressing the issue.

Figure 5:
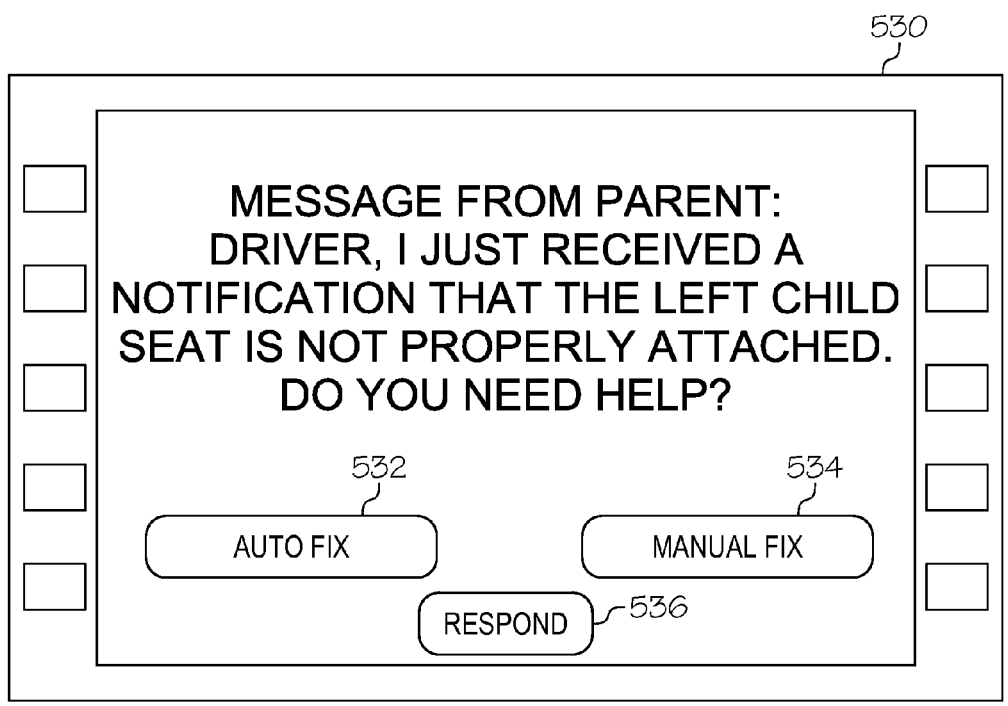
FIG. 5 schematically depicts a user interface for providing a message from a guardian to a vehicle passenger, according to embodiments disclosed herein.

FIG. 5 schematically depicts a user interface 530 for providing a message from a guardian to a vehicle passenger, according to embodiments disclosed herein. As discussed above, some embodiments may be configured to alert a remote parent via the mobile computing device 108 when an issue exists with the child restraint seat 106. As an example, if grandparents of the child are driving the vehicle 102 without the parent being present, the parent may wish to be alerted if the child restraint seat 106 is not properly utilized. In response to receiving the alert, the parent may send a message back to the vehicle 102 (and/or grandparent's mobile device). Accordingly, the user interface 530 may provide that message to the passenger.

The user interface 530 may also provide an automatic repair option 532, a manual repair option 534, and a respond option 536. In response to selection of the automatic repair option 532, the vehicle computing device 130 may automatically address the issue detected. In response to selection of the manual repair option 434, the vehicle computing device 130 may provide instructions to the passenger for addressing the issue. A check may be performed to determine if the passenger has addressed the issue. If so, the alert may be extinguished. In response to selection of the respond option 536, the passenger may be provided with options for responding to the message that was received.

Figure 6:
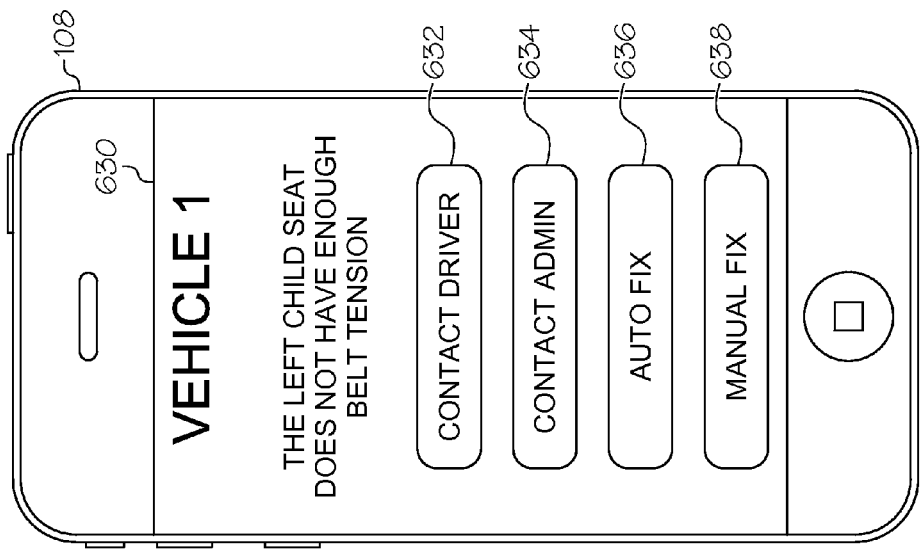
FIG. 6 depicts a user interface that may be provided to a guardian of a child, indicating that a child restraint seat has been improperly utilized, according to embodiments disclosed herein.

FIG. 6 depicts a user interface 630 that may be provided to a remote guardian of a child, indicating that a child restraint seat 106 has been improperly utilized, according to embodiments disclosed herein. As discussed above, some embodiments may be configured to notify a third party, such as a guardian of the child and/or an administrator (such as via the mobile computing device 108 and/or the administrator computing device 110) if an issue is detected. Accordingly, the user interface 630 represents an alert that may be received by the third party. As illustrated, the user interface 630 may include the alert, as well as a contact driver option 632, a contact administrator option 634, an automatic repair option 636, and a manual repair option 638.

In response to selection of the contact driver option 632, a call (or other communication) may be initiated to the vehicle 102 and/or to a mobile computing device 108 of one of the passengers. In response to selection of the contact administrator option 634, a call (or other communication) may be initiated to the administrator computing device 110. This call may then result in the administrator contacting the vehicle 102 to assist the vehicle passenger in properly utilizing the child restraint seat 106. In response to selection of the automatic repair option 636, the vehicle computing device 130 may facilitate automatically addressing the issue as described above. In response to selection of the manual repair option 638, the vehicle computing device 130 may provide instructions to the passenger of the vehicle 102 for correcting the issue.

Figure 7:
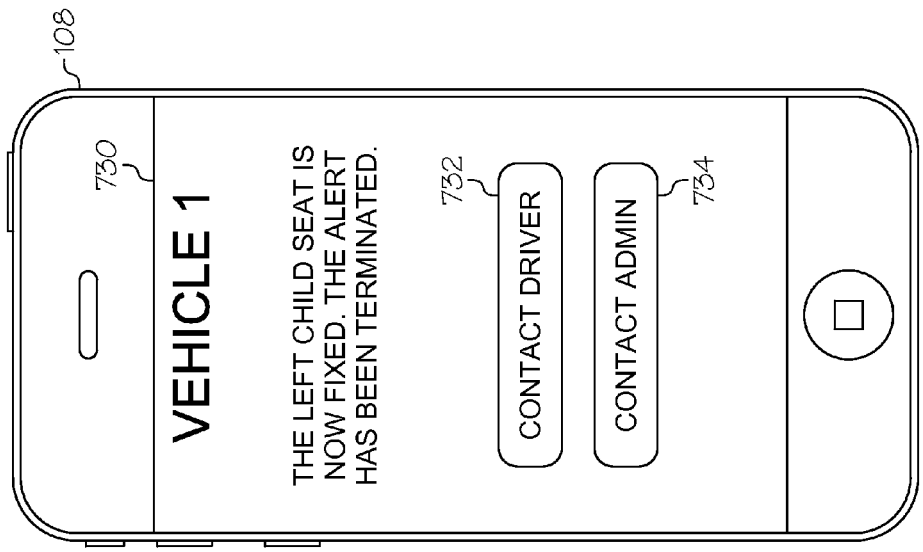
FIG. 7 depicts a user interface that may be provided to a guardian of a child, providing options for contacting a third party regarding improper utilization of a child restraint seat, according to embodiments disclosed herein.

FIG. 7 depicts a user interface 730 that may be provided to a remote guardian of a child, providing options for contacting a third party regarding improper utilization of a child restraint seat 106, according to embodiments disclosed herein. The user interface 730 may be provided in response to the vehicle computing device 130 determining that the issue has been resolved. This may be in response to a manual repair, an automatic repair and/or other solution. Regardless, the user interface 730 also includes a contact driver option 732 and a contact administrator option 734 for initiating communication with the vehicle 102 and/or the administrator.

It should be understood that in some embodiments the communications sent to the guardian are sent when that guardian is detected as being remote from the vehicle 102. In some embodiments however, similar communications may be sent to the mobile computing device 108 of a guardian who is located proximate with the vehicle. As an example, the guardian may be located in a back seat and thus not in a position to operate the vehicle computing device 130 directly. As such, the guardian may utilize the mobile computing device 108 of perform the functionality described herein.

Figure 8:
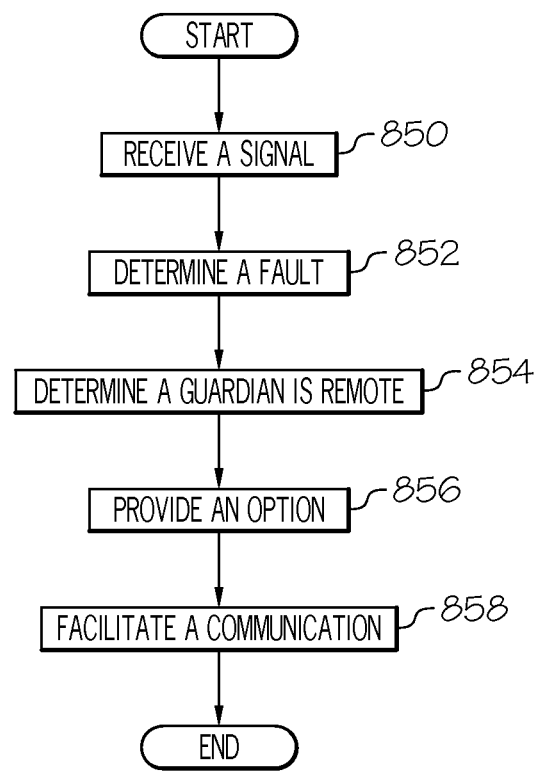
FIG. 8 depicts a flowchart for facilitating a communication with a guardian of a child, according to embodiments disclosed herein.

FIG. 8 depicts a flowchart for facilitating a communication with a guardian of a child, according to embodiments disclosed herein. As illustrated in block 850, a signal from a child restraint seat 106 may be received, where the signal is related to proper utilization of the child restraint seat 106 in the vehicle 102. In block 852, a determination may be made from the signal regarding whether a fault has occurred with the utilization of the child restraint seat 106. In block 854, a determination may be made regarding whether a guardian is remote form the vehicle. In block 856, an option for the guardian to contact a user of the vehicle 102 may be provided to indicate the improper utilization of the child restraint seat 106. In block 858, a communication between the guardian and a user of the vehicle 102 may be facilitated.

FIG. 9 depicts a vehicle computing device 130 for monitoring a child restraint seat 106, according to embodiments disclosed herein. The vehicle 102 is depicted in FIG. 9 as an automobile but may be any passenger or non-passenger vehicle such as, for example, a terrestrial, aquatic, and/or airborne vehicle may be included. The vehicle 102 may be coupled to a remote computing device 804 and/or a user computing device 806 for receiving content and/or other data via a network 800. The network may include a wide area network, local area network, and/or other wired or wireless network for communicating data, as described herein.

Also illustrated is the vehicle computing device 114, which includes the processor 930, input/output hardware 932, the network interface hardware 934, a data storage component 936 (which stores child seat data 938a, vehicle data 938b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 130 and/or external to the vehicle computing device 114.

The memory component 140 may store operating logic 942, the detection logic 144a and the communication logic 144b. The detection logic 144a and the communication logic 144b may each include a plurality of different pieces of logic, each of which may be embodied as a computer program, firmware, and/or hardware, as an example. A local interface 946 is also included in FIG. 9 and may be implemented as a bus or other communication interface to facilitate communication among the components of the vehicle computing device 130.

The processor 930 may include any processing component operable to receive and execute instructions (such as from a data storage component 936 and/or the memory component 140). As described above, the input/output hardware 932 may include and/or be configured to interface with the components of FIG. 9. As an example, the input/output hardware 932 may include microphones, speakers 208, the on-board display device 206, the seatbelt tension sensor 302, the child restraint seat seatbelt tension sensor 304, the child restraint seat seatbelt latch sensor 306, the tilt sensor 308a, 308b (FIG. 3A), the seatbelt latch sensor 322, the seatbelt strap sensor 324, the seat sensor 326a, the lumbar sensor 326b, and the vehicle seat position control 328, and/or other hardware in the vehicle 102

The network interface hardware 934 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the vehicle computing device 130 and other computing devices.

The operating logic 942 may include an operating system and/or other software for managing components of the vehicle computing device 130. Similarly, as discussed above, the detection logic 144a may reside in the memory component 134 and may be configured to cause the processor 930 to determine an issue with utilization of the child restraint seat 106. Similarly, the communication logic 144b may be utilized to communicate alerts and/or commands to users and/or other portions of the vehicle 102.

It should be understood that while the components in FIG. 9 are illustrated as residing within the vehicle computing device 130, this is merely an example. In some embodiments, one or more of the components may reside external to the vehicle computing device 130. It should also be understood that, while the vehicle computing device 130 is illustrated as a single device, this is also merely an example. In some embodiments, the detection logic 144a and the communication logic 144b may reside on different computing devices. As an example, one or more of the functionalities and/or components described herein may be provided by the mobile computing device 108, the child restraint seat 106, and/or administrator computing device 110, which may be coupled to the vehicle 102 via the network 100.

Additionally, while the vehicle computing device 130 is illustrated with the detection logic 144a and the communication logic 144b as separate logical components, this is also an example. In some embodiments, a single piece of logic may cause the vehicle computing device 130 to provide the described functionality.

As illustrated above, various embodiments for monitoring child restraint are disclosed. Accordingly, embodiments disclosed herein may provide a vehicle passenger and/or guardian with an indication of whether a child restraint seat is being properly utilized. Additionally, embodiments may be configured to contact a remote guardian or other third party that the child restraint seat is being improperly utilized. Some embodiments may be configured to manually and/or automatically repair the utilization of a child restraint seat, to ensure that the child restraint seat is being properly utilized.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for monitoring child restraint. It should also be understood that these embodiments are merely exemplary and are not intended to limit the scope of this disclosure.

What is claimed is:

1. A method for child restraint monitoring comprising:
   determining whether a child restraint seat is being properly utilized in a vehicle seat of a vehicle;
   detecting an issue with the utilization of the child restraint seat; and
   in response to detecting the issue with the utilization of the child restraint seat, providing a repair option to a passenger of the vehicle to address the issue.

2. The method of claim 1, further comprising notifying an administrator of the issue for sending a communication to a remote guardian of an occupant of the child restraint seat.

3. The method of claim 1, wherein the repair option comprises a manual repair option, wherein in response to selection of the manual repair option, a user interface is provided to the passenger to manually address the issue.

4. The method of claim 1, wherein the repair option comprises an automatic repair option, wherein in response to selection of the automatic repair option, a command is sent to the child restraint seat to automatically address the issue.

5. The method of claim 1, wherein the repair option comprises an automatic repair option, wherein in response to selection of the automatic repair option, a command is sent to the vehicle seat to automatically address the issue.

6. The method of claim 1, wherein the issue includes at least one of the following, the child restraint seat being tilted relative to the vehicle seat, a seatbelt that is securing the child restraint seat to the vehicle seat lacking adequate tension to secure the child restraint seat, and the vehicle seat being out of position to adequately secure the child restraint seat.

7. The method of claim 1, further comprising determining whether the child restraint seat is adequately powered and, in response to determining that the child restraint seat is not adequately powered, providing an indication to the passenger.

8. A system for child restraint monitoring, comprising:
a processor;
a first sensor that is coupled to the processor and detects whether a child restraint seat is being properly utilized in a vehicle seat; and
a memory component that is coupled to the processor, wherein the memory component stores logic that, when executed by the processor, causes the system to perform at least the following:
receive a first signal from the first sensor, wherein the first signal indicates whether the child restraint seat is being utilized properly;
determine, from the first signal, an issue with utilization of the child restraint seat; and
in response to determining the issue with utilization of the child restraint seat, provide an option to address the issue.

9. The system of claim 8, further comprising a motor, wherein the logic further causes the system to provide a command to automatically address the issue, wherein the command to automatically address the issue with utilization of the child restraint seat comprises, providing an activation command to the motor for adjusting a setting of the child restraint seat.

10. The system of claim 8, wherein the first sensor detects at least one of the following: the child restraint seat being tilted relative to the vehicle seat, a seatbelt that is securing the child restraint seat to the vehicle seat lacking adequate tension to secure the child restraint seat, and the vehicle seat being out of position to adequately secure the child restraint seat.

11. The system of claim 8, wherein the logic further causes the system to contact a third party to report the issue, wherein the third party comprises at least one of the following: a guardian of an occupant of the child restraint seat and an administrator.

12. The system of claim 8, wherein the logic causes the system to provide a manual repair option, wherein in response to selection of the manual repair option, the logic causes the system to provide instructions for a passenger to manually address the issue.

13. The system of claim 8, further comprising a second sensor that is coupled to the memory component, wherein determining the issue with utilization of the child restraint seat further comprises receiving a second signal from the second sensor, wherein the second sensor detects an issue with the vehicle seat.

14. The system of claim 13, wherein the second sensor comprises at least one of the following: a seatbelt latch sensor, a seatbelt strap sensor, a seat sensor, a lumbar sensor, and a vehicle seat position control.

15. The system of claim 8, wherein the first sensor comprises at least one of the following: a seatbelt tension sensor, a child restraint seat seatbelt tension sensor, a child restraint seat seatbelt latch sensor, and a tilt sensor.

16. A system for child restraint monitoring comprising:
a vehicle seat for a vehicle, the vehicle seat receiving a child restraint seat, wherein the vehicle seat comprises a sensor that detects a characteristic of utilization of the child restraint seat, wherein the vehicle seat comprises a first motor for adjusting a configuration of the vehicle seat;
a computing device comprising a processor and a memory component, wherein the memory component stores logic that, when executed by the processor, causes the system to perform at least the following:
receive a signal from the sensor, wherein the signal indicates whether the child restraint seat is being utilized properly;
determine, from the signal, an issue with utilization of the child restraint seat; and
in response to determining the issue with utilization of the child restraint seat, send an activation command to the first motor to provide a repair option to a passenger of the vehicle to address the issue.

17. The vehicle of claim 16, wherein the sensor comprises a seatbelt tension sensor.

18. The vehicle of claim 16, wherein the logic causes the system to provide a manual repair option, wherein in response to selection of the manual repair option, the logic causes the system to provide instructions for the passenger to manually address the issue.

19. The vehicle of claim 16, further comprising, in response to determining the issue with utilization of the child restraint seat, the logic causes the computing device to send a communication to a third party, wherein the communication provides an option to contact the vehicle to indicate improper utilization of the child restraint seat.

20. The vehicle of claim 16, wherein the issue includes at least one of the following, the child restraint seat being tilted relative to the vehicle seat, a seatbelt that is securing the child restraint seat to the vehicle seat lacking adequate tension to secure the child restraint seat, and the vehicle seat being out of position to adequately secure the child restraint seat.

* * * * *

UNITED STATES PATENT AND TRADEMARK OFFICE
CERTIFICATE OF CORRECTION

PATENT NO.        : 9,597,984 B2                         Page 1 of 1
APPLICATION NO.   : 14/930892
DATED             : March 21, 2017
INVENTOR(S)       : Sean L. Helm It is certified that error appears in the above-identified patent and that said Letters Patent is hereby corrected as shown below:

In the Specification

In Column 7, Line 32 after "to selection", delete "f" and insert --of--, therefor.

Signed and Sealed this
Twenty-third Day of May, 2017

Michelle K. Lee
*Director of the United States Patent and Trademark Office*